United States Patent

[11] 3,621,960

| [72] | Inventor | Andrew T. Kornylak<br>Hamilton, Ohio |
|---|---|---|
| [21] | Appl. No. | 808,851 |
| [22] | Filed | Apr. 4, 1969 |
| [45] | Patented | Nov. 23, 1971 |
| [73] | Assignee | Kornylak Corporation<br>Hamilton, Ohio<br>The portion of the term of the patent subsequent to May 13, 1986, has been disclaimed. |

[54] CONVEYOR WITH ROLLERS HAVING TIRES OF HIGH-HYSTERESIS MATERIAL
4 Claims, 4 Drawing Figs.

[52] U.S. Cl. .................................................... 193/35 A,
    152/313, 193/37
[51] Int. Cl. .................................................... B65g 13/00
[50] Field of Search .......................................... 152/313;
    193/37, 35; 260/75 T, 75 TN, 75 H, 77.5 AQ, 75
    NQ; 264/45

[56] References Cited
UNITED STATES PATENTS

| 2,730,222 | 1/1956 | Klein ............................ | 193/37 |
| 2,621,166 | 12/1952 | Schmidt et al. ................ | 260/75 TNQ |
| 3,245,961 | 4/1966 | Fetscher et al. ............... | 260/75 TNH X |
| 3,300,835 | 1/1967 | Barr .............................. | 193/37 X |
| 3,388,087 | 6/1968 | Dieterich et al. ............. | 260/75 TNQ X |
| 3,396,773 | 8/1968 | Alderfer ....................... | 264/45 X |
| 3,443,674 | 5/1969 | Kornylak ...................... | 193/37 |

Primary Examiner—Evon C. Blunk
Assistant Examiner—W. Scott Carson
Attorney—Jay M. Cantor ABSTRACT: A gravity conveyor having rollers to retard the speed of the load. Each roller is provided with a tire formed of a urethane polymer having a durometer hardness between about 60 and 85A. The deformation of the material converts sufficient energy of the load into heat to limit the speed of the load.

PATENTED NOV 23 1971

3,621,960

INVENTOR
ANDREW T. KORNYLAK

BY Harold L. Halpert
AGENT

CONVEYOR WITH ROLLERS HAVING TIRES OF HIGH-HYSTERESIS MATERIAL

This invention relates to rollers for roller conveyors and is particularly applicable to that kind of roller conveyor which is used for storage purposes in the form of so-called "live storage."

It is well-known to construct such a conveyor in the form of a line of freely rotatable idler rollers and it is known to incline the conveyor so that pallets, boxes or articles placed one one end of it will move under gravity to the other end. A problem here is that, if the gradient is sufficient to ensure that the loads, whether light or heavy, will always be certain to move down the track, then there is the probability that under some conditions the loads will acquire a substantial velocity and will reach the end of the track at a speed such as to lead to damage.

To solve this problem proposals have been made to restrain the rollers against free rotation, for example by means of friction brakes, but these are liable to be erratic in their operation and their behavior changes with time. Furthermore, the provision of such a brake on every roller or even on only some of them substantially increases the cost of the structure.

The aim of the present invention is to provide a controlled restraint for the goods on a gravity roller conveyor without involving separate and complicated mechanical devices.

This and other aims of this invention will become manifest upon reading the following description in conjunction with the accompanying drawing wherein.

Figure 1:
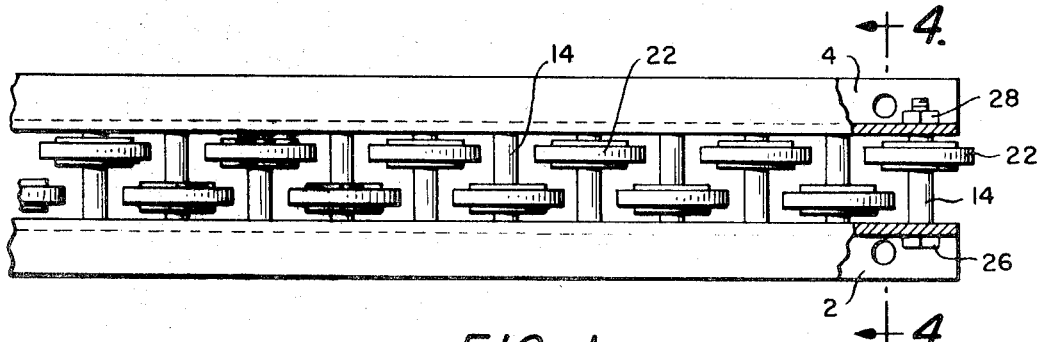
FIG. 1 is a top plan view, partly in section of a portion of a rollerway section showing a use of the roller of this invention.
Figure 2:
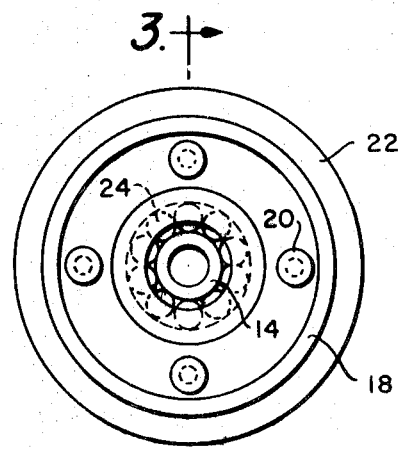
FIG. 2 is a side elevation of a roller.
Figure 3:
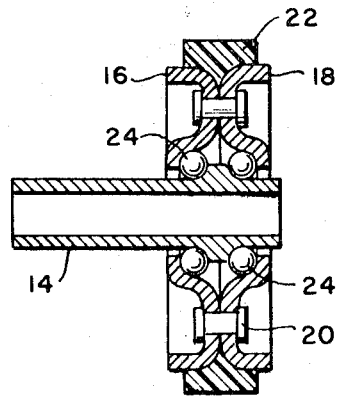
FIG. 3 is a section taken on the line 3—3 of FIG. 2.
Figure 4:
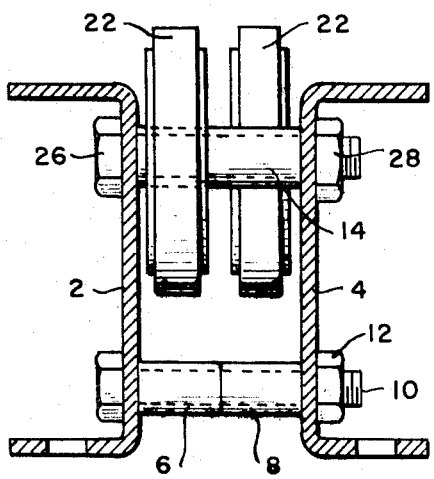
FIG. 4 is a section taken on the line 4—4 of FIG. 1.

According to the invention we now propose to use in such a conveyor, especially, though not exclusively for use in live storage, rollers of which at least the surface layers are formed of an elastomeric material having high-hysteresis properties, that is to say, having the ability to absorb energy on deformation and to convert it into heat rather than simply to store the energy purely elastically. Another way of putting it is to say one selects an elastomeric material of poor resilience, or having low coefficient or restitution.

Referring to the drawings there is disclosed a rollerway comprising spaced channels 2 and 4 spaced apart by sleeves 6 and 8 mounted on bolts 10 passing through the channels and locked thereon by nuts 12. The rollers each comprise a hub 14 having a pair of segments 16 and 18 secured together by rivets 20. The segments form a rim on which is mounted a tire 22. The rim is rotatably mounted on the hub by balls 24. The hub is mounted on a bolt 26 passing through the channels and locked thereon by nuts 28. The material of the tire is described in greater detail below.

As the load, moving down the conveyor, strikes a roller it deforms the elastomeric surface of the roller in the usual manner of a rigid surface engaging a resilient tire in rolling contact but whereas with a perfectly elastic rubber tire all the energy stored up in any given small element of the rubber as it is deformed by impact with the rigid body is given up again as the element returns to its former shape, the roller according to the invention has a characteristic "deadness" and absorbs the energy of impact, so that a smooth but yielding resistance is offered to the load.

The rollers can be mounted to rotate freely on spindles. Although they could be formed wholly of the desired elastomeric material, such a construction would generally only be suitable for very light loads and in practice we prefer to use a rigid hub with a tire of the elastomeric material. The shape and proportions of the roller could for example be as shown in British Pat. No. 1,042,860 or U.S. Pat. No. 3,057,448 of the present inventor, or the rollers could be of elongated form, covered throughout their axial length with the elastomeric material.

The thickness of the tire and its hardness will be selected to suit the loads for which the conveyor is to be designed. The material could, as in the above-mentioned earlier patent specifications, have a Shore durometer hardness of 60 or of 65 to 85 where the conveyor is for supporting standard pallets, but the hysteresis properties will be appropriately modified in accordance with the present invention. Particularly suitable elastomers of the required properties are to be found in the polyurethane class.

Some typical arrangements in accordance with the invention and the test results obtained with them will now be described by way of example.

EXAMPLE 1

A pair of spaced rails was constructed, each carrying a staggered arrangement of rollers or wheels mounted to rotate freely on spindles, as described and illustrated in British Pat. No. 1,042,860. Each roller or wheel had a central rigid metal portion having an outside diameter of 1⅞ inches, and a rim width of half an inch. To the rim was bonded a tire of plain rectangular cross section having a width of half an inch and a thickness of three-sixteenths of an inch, giving an overall diameter of 2¼ inches. The wheels were spaced at 2½-inch centers.

The tires were made of a urethane polymer having a durometer hardness of 75A. The urethane formulations was made up of 100 parts by weight of isocyanate-terminated prepolymer (based on a special polyester polyol) to 27 parts by weight of tri-iso-propanolamine.

Using a conventional wooden pallet carrying a load of 2,000 pounds and placed on the rails with the bottom slats of the pallet running transverse to the direction of movement, tests were made, running the pallet down the rails which were placed at varying inclinations to the horizontal. At all inclinations between a minimum of five-sixteenths of an inch fall per foot and a maximum of fifteen thirty-seconds of an inch per foot run the speed gained by the pallet, starting from the rest did not exceed a range of 7 inches per second.

EXAMPLE 2

Two rails, each constructed as in patent specification 1,042,860, were equipped with wheels of 2¾-inch diameter, 1⅝ inches wide and provided with tires a quarter of an inch thick and 1⅝ inches wide, to give an overall diameter of 3¼ inches. The wheels were spaced at 3½-inch centers. The tires were made of urethane elastomer of the same composition as in example 1, but had a durometer hardness of 85A.

Tests were made using a steel skid box weighing 7,000 pounds and equipped with skid runners 41 inches long and 1¼ inches wide, extending in the direction of travel. The rails were arranged at an inclination of five-sixteenths of an inch fall per foot. The skid box was allowed to start from rest at the upper end and its speed at the end of a run of 77 feet down the rails was less than 15 inches per second.

EXAMPLE 3

Finally a large pair of rails was constructed with rollers having tires 24 inches wide and 1 9/16 inches thick to give an overall wheel diameter of 11¾ inches. The high-hysteresis polyurethane materials of the tires had a durometer hardness of 85A. The wheels were spaced at 17 ½inch centers. Inclined at an appropriate angle, these were found satisfactory in the handling of heavy flat-bottomed seagoing craft without undue acceleration, although exact figures are not known.

What I claim is:

1. A gravity conveyor comprising a support and a linear series of rollers mounted for rotation in said support, each roller comprising a rigid hub having a rim portion and a tire of a urethane polymer having a high hysteresis mounted on the rim, said polymer having a Shore durometer hardness between 60, and 85A. whereby the speed of a free moving load down the conveyor is retarded.

2. A conveyor as defined in claim 1, wherein said material comprises substantially 100 parts by weight of an isocyanate-terminated prepolymer based on a polyester polyol and 27 tri-iso-propanolamine. parts by weight of tri-iso-propanolamine.

3. A gravity conveyor comprising a support and a linear series of rollers mounted for rotation in said support, each roller comprising a rigid hub having a rim portion and a tire of a urethane polymer having a low coefficient of restitution mounted on the rim, said polymer having a Shore durometer hardness between 60 and 85A, whereby the speed of a free-moving load down the conveyor is retarded.

4. A conveyor as defined in claim 3, wherein the material comprises substantially 100 parts by weight of an isocyanate-terminated prepolymer based on a polyester polyol and 27 parts by weight of tri-iso-propanolamine.

* * * * *